United States Patent [19]

Schleupen

[11] Patent Number: 4,901,697

[45] Date of Patent: Feb. 20, 1990

[54] DEVICE FOR CONTROLLING AN INTERNAL COMBUSTION ENGINE

[75] Inventor: Richard Schleupen, Ingersheim, Fed. Rep. of Germany

[73] Assignee: Robert Bosch GmbH, Stuttgart, Fed. Rep. of Germany

[21] Appl. No.: 347,888

[22] PCT Filed: Aug. 8, 1987

[86] PCT No.: PCT/DE87/00350

§ 371 Date: Mar. 6, 1989

§ 102(e) Date: Mar. 6, 1989

[87] PCT Pub. No.: WO88/01692

PCT Pub. Date: Mar. 10, 1988

[30] Foreign Application Priority Data

Sep. 5, 1986 [DE] Fed. Rep. of Germany ....... 3630271

[51] Int. Cl.$^4$ .............................................. F02P 7/067
[52] U.S. Cl. ....................................... 123/414; 123/617
[58] Field of Search ......... 123/476, 617, 414, 146.5 A

[56] References Cited

U.S. PATENT DOCUMENTS

| 4,072,893 | 2/1978 | Huwyler | 324/208 |
| 4,327,687 | 5/1982 | Haubner et al. | 123/416 |
| 4,744,343 | 5/1988 | Bisenius et al. | 123/476 |

FOREIGN PATENT DOCUMENTS 2643286 3/1978 Fed. Rep. of Germany .

OTHER PUBLICATIONS

Patent Abstracts of Japan, vol. 5, Nr. 199 (M-102)(871), 17 Dec. 1981, & JP, A, 56118560 (Hitachi Seisakusho K.K.), 17 Sep. 1981.
Patent Abstracts of Japan, vol. 5, Nr. 53 (M-63)(725), 14 Apr. 1981, & JP, A, 569660 (Hitachi Seisakusho K.K.), 31 Jan. 1981.

Primary Examiner—Tony M. Argenbright
Assistant Examiner—Robert E. Mates
Attorney, Agent, or Firm—Michael J. Striker

[57] ABSTRACT

A device for controlling an internal combustion engine of a motor vehicle and comprising a transmitter disk which rotates with a shaft of the internal combustion engine relative an opposite stationary receiving element, the transmitter disk being provided at its circumference with a plurality of segments proportional to the number of cylinders, and a permanent magnet assigned to at least one of the segments for generating a marking signal to be fed to a control circuit for the ignition, injection and the like of the motor vehicle via the receiving element.

5 Claims, 2 Drawing Sheets

FIG. 2
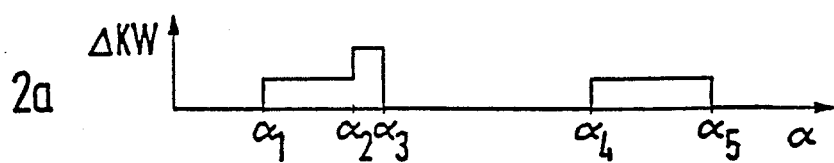
2a
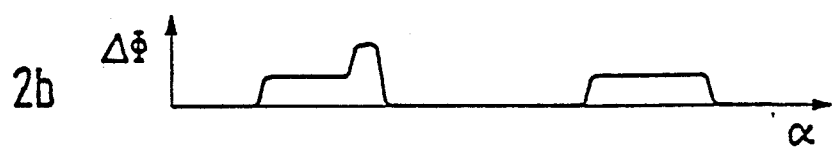
2b
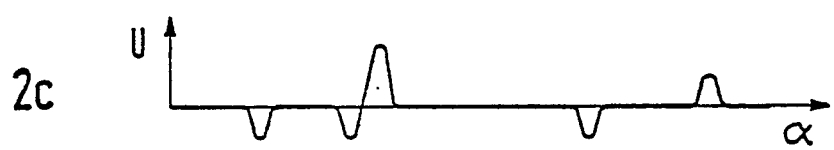
2c
FIG. 3
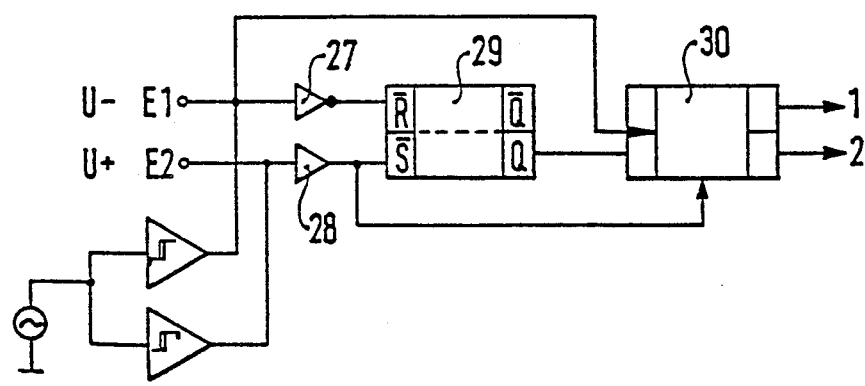

DEVICE FOR CONTROLLING AN INTERNAL COMBUSTION ENGINE

BACKGROUND OF THE INVENTION

The invention relates to a device for controlling an internal combustion engine. In devices for controlling an internal combustion engine of a motor vehicle, particularly for controlling the ignition and the like, it is known to use sensor systems for detecting an angular position of a shaft of the internal combustion engine, particularly the crankshaft or the camshaft.

Such systems are constructed e.g. as segment systems in and transmitter disks rotate with the shaft, which are provided at their circumference with a plurality of segments, i.e. elongated marked areas, proportional to the number of cylinders of the internal combustion engine. In the detection of the angular position of the crankshaft, the number of segments amounts to one half of the number of cylinders. In the detection of the angular position of the camshaft the number of segments is identical to the number of cylinders, since the crankshaft rotates at twice the speed of the camshaft, as is known. Every segment is assigned to a cylinder (n) of the internal combustion engine (two cylinders in the detection of the angular position of the crankshaft), and every ignition process is controlled as a function of the passage of a respective segment. In a stationary receiving element, the leading edge of the segment is detected, and the control processes for the internal combustion engine are triggered by a suitable time control over the entire length of the segment. On the other hand, segment systems with segments of equal dimensions have the disadvantage that an assignment, which is sufficient for a high-voltage distribution without the use of a distributor or for a dual-circuit (e.g. eight-cylinder engine) high-voltage distribution, is not possible.

In addition, segment systems are known in which individual segments are divided by a number of teeth and tooth spaces and the signals produced by the teeth and tooth spaces, respectively, are fed to a control circuit. In so doing, the angular position of the shaft is determined by counting the passing teeth and tooth spaces, respectively. This method is costly and requires an additional counting device.

In addition, if only a single tooth space is formed in a segment, there is the risk that the additional trailing edge will trigger an additional ignition.

In all devices mentioned here, at least one revolution is required when starting the internal combustion engine in order to detect an accurate assignment of the marking.

SUMMARY OF THE INVENTION

The object of the invention is a device in which it is possible to assign the ignition pulses for a high-voltage distribution without the use of a distributor or for a dual-circuit high-voltage distribution with a single transmitter while maintaining the two electrical marks at the beginning and end of the segment. The object of the invention is achieved by assigning a permanent magnet to at least one segment as a mark which generates a signal which can be fed to a control circuit. Because of the resulting electric signals (markings), the cylinder groups can be clearly assigned in a high-voltage distribution without the use of a distributor. It is not necessary to change the profile of the segments, so that no cracks can occur as a result of of stresses particularly at high engine output moments.

The total length of the segment having the permanent magnet thereon is equal to that of other segments.

The present invention as to its construction so to its method of operation, together with additional objects and advatnages thereof, will be best understood from the following description of the preferred embodiment with reference to the accompanying drawings.

BRIEF DESCRIPTION OF THE DRAWINGS

FIGS. 2a, 2b, and 2c show a pulse diagram; and

FIG. 3 shows a circuit diagram according to the present invention.

DESCRIPTION OF THE PREFERRED EMBODIMENT

Figure 1:
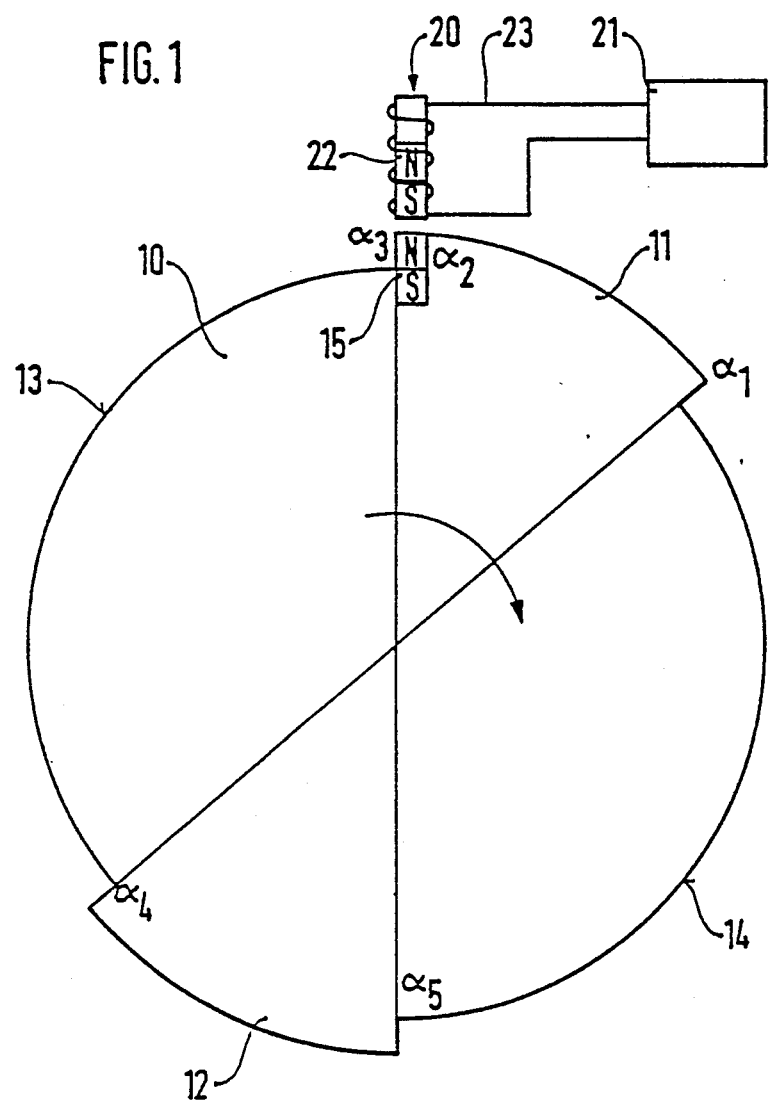
FIG. 1 shows a basic view of a transmitter disk of the device according to the present invention.

In FIG. 1, a transmitter disk designated by 1, 1 rotates with a crankshaft or a camshaft of an internal combustion engine. At its circumference, the transmitter disk 10 comprises segments 11, 12 and spaces 13, 14 located between the latter. If two segments and two gaps, respectively, are provided, as in FIG. 1, and the transmitter disk 10 is fastened at the crankshaft of the internal combustion engine, it is suitable for devices for controlling four-cylinder engines. The segments 11, 12 have equal lengths the same angle of rotation and are located diametrically opposite one another. A permanent magnet 15, whose polarity is formed in the radial direction of the transmitter disk 10, is arranged at the end of the segment 11. The height of the permanent magnet 15 corresponds to the height of the segment 11 and is adpated to the surface curvature of the segment 11. The segment 11, including the permanent magnet 15, corresponds in length to the segment 12. Accordingly, the segment 11 is to be shortened, e.g. by milling, by an amount corresponding to the width of the permanent magnet 15 during production.

A stationary receiving element 20, which is, in turn, in a operative connection with a control circuit 21 and, is located in the vicinity of the circumference of the transmitter disk 10. The type of interaction betweenn the transmitter disk 10 and receiving element 20 can vary to a great extent. To provide for magnetic interaction, the transmitter disk 10 can be punched out from a ferromagnetic sheet metal and an inductive sensor, which already has a magnetic flux in the rest state, is used as a receiving element 20. The receiving element 20 shown in FIG. 1 comprises a permanent magnet 22 and a coil 23.

If the transmitter disk 10, as shown in FIG. 1, rotates in the clockwise direction, the receiving element 20 detects-e.g. in segment 12 the leading edge of the segment 12. The ignition process can then be triggered e.g. at the end of the segment 12 at an angular position corresponding to the trailing edge of the segment 12.

In order to illustrate the manner of operation of the device shown in FIG. 1, FIG. 2 shows the time characteristic of signals generated by the segments 11, 12 and the spaces 13, 14, respectively, and by the permanent magnet 15. FIG. 2a shows a transmission of the rotational movement of the crankshaft ($\Delta$ CS) to the rotation of the transmitter disk 10 as a function of the angle of rotation ($\alpha$) of the transmitter disk. In FIG. 2b, the magnetic flux ($\Delta\Phi$) produced in the receiving element 20 is shown as a function of the angle of rotation ($\alpha$) of the transmitter disk 10. If the transmitter disk 10 moves in the clockwise direction, a change in the magnetic flux is produced at the leading edge of the segment 11, i.e. at the angular position $a_1$, in the receiving element 20. The magnetic flux runs at the same height, while the segment 11 passes the receiving element 20; consequently, no voltage is induced. When the receiving element 20 reaches the permanent magnet 15, i.e. the transmitter disk 10 is located in the angular position $a_2$, the magnetic flux increases again. When the receiving element 20 reaches the end of the permanent magnet 15, i.e. the leading edge of the segment 11 and angular position $a_3$, respectively, the magnetic flux decreases. While the space 13 now passes the receiving element 20, no substantial magnetic flux is generated. In a manner analogous to segment 11, a change in the magnetic flux is now produced also by segment 12 at its leading edge as well as at its trailing edge, i.e. at the angular position $a_4$ and $a_5$.

FIG. 2c shows the pulses generated in the receiving element 20. A negative pulse is generated in each instance at the leading edge of the segments 11, 12, i.e. at the angular position $a_1$ and $a_4$. The pulse is dependent on the polarity of the receiving element 20. When the receiving element 20 reaches the permanent magnet in angular position $a_2$, another negative pulse is produced. When the receiving element 20 reaches the rear flank of the segments 11, 12, i.e. the transmitter disk 10 is located at angular position $a_3$ and $a_5$, a positive pulse is produced. Due to the magnetic field of the permanent magnet 15, the positive pulse at position $a_3$ is greater than the pulse in position $a_5$. The additional pulse produced in position $a_2$, and the different pulse height at position $a_3$, respectively, can now be used as a mark.

The voltages produced in the receiving element 20 at the edges of the segments 11 and 12, respectively, and in position $a_2$ by the permanent magnet 15, are fed to two input terminals E1 and E2 of the control circuit shown in the basic diagram in FIG. 3 via two Schmitt triggers having different switching thresholds. An inverter 27 is connected to the input terminal E1, to which the voltage $U_-$ is applied. On the other hand, a non-inverting driver stage 28 is connected to the input terminal E2 to which the voltage $U_+$ is applied. The output of the inverter 27 is connected with the inverting reset input of a flip-flop 29. The output of the driver stage 28 is connected to its inverting set input. A line leads from the output Q of the flip-flop 29 to the clear-enable input of a counter 30. The inverting clear enable input of the counter 30 is connected with the output of the driver stage 28. In addition, the voltage $U_-$ tapped prior to the inverter 27 is applied to the counter input of the counter 30. Lines lead from the two outputs of the counter 30 to the two cylinder groups of a four-cylinder engine. This circuit serves to achieve a synchronous pulse in order to enable an accurate assignment of the position of the transmitter disc relative to the respective rotation of the shaft already when starting the internal combustion engine. Of course, this principle of control is applicable to all engines with an even number of cylinders. In asymmetrical engines, it must be ensured that the asymmetry occurs within a crankshaft revolution.

While the invention has been illustrated and described as embodied in a device for controlling an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling an internal combustion engine having a shaft and a predetermined number of cylinders, said device comprising:
    a transmitter disc mountable on the internal combustion engine shaft for joint rotation therewith for determining angular positions of said shaft, said transmitter disc having a plurality of circumferentially spaced segments proportional to the predetermined number of cylinders;
    a stationary receiving element for generating control signals in accordance with positions of said segments; and
    a control circuit for controlling the internal combustion engine in accordance with the control signals generated by said receiving element, said transmitter disc including a permanent magnet formed as a mark and associated with at least one of said plurality of segments for generating a signal communicated to said control circuit, an overall circumferential length of said one of said plurality of segments together with said permanent magnet being equal to that of others of said plurality of segments.

2. A device according to claim 1 wherein each of said plurality of segments has leading and trailing edges, said stationary receiving element generating control signals in accordance with positions of said leading and trailing edges.

3. A device according to claim 2 wherein said permanent magnet is polarized in a radial direction of said transmitter disc.

4. A device according to claim 2 wherein said one of said plurality of segments has an end, said permanent magnet being arranged at said end of said one of said plurality of segments.

5. A device according to claim 2 wherein said control circuit controls ignition of the internal combustion engine, said transmitter disc being formed for ignition with one of a high-voltage distribution without use of a distributor and a dual-circuit high-voltage distribution.

* * * * *